July 7, 1936.  J. H. KURLANDER  2,046,388
PHOTOFLASH LAMP
Filed May 16, 1933
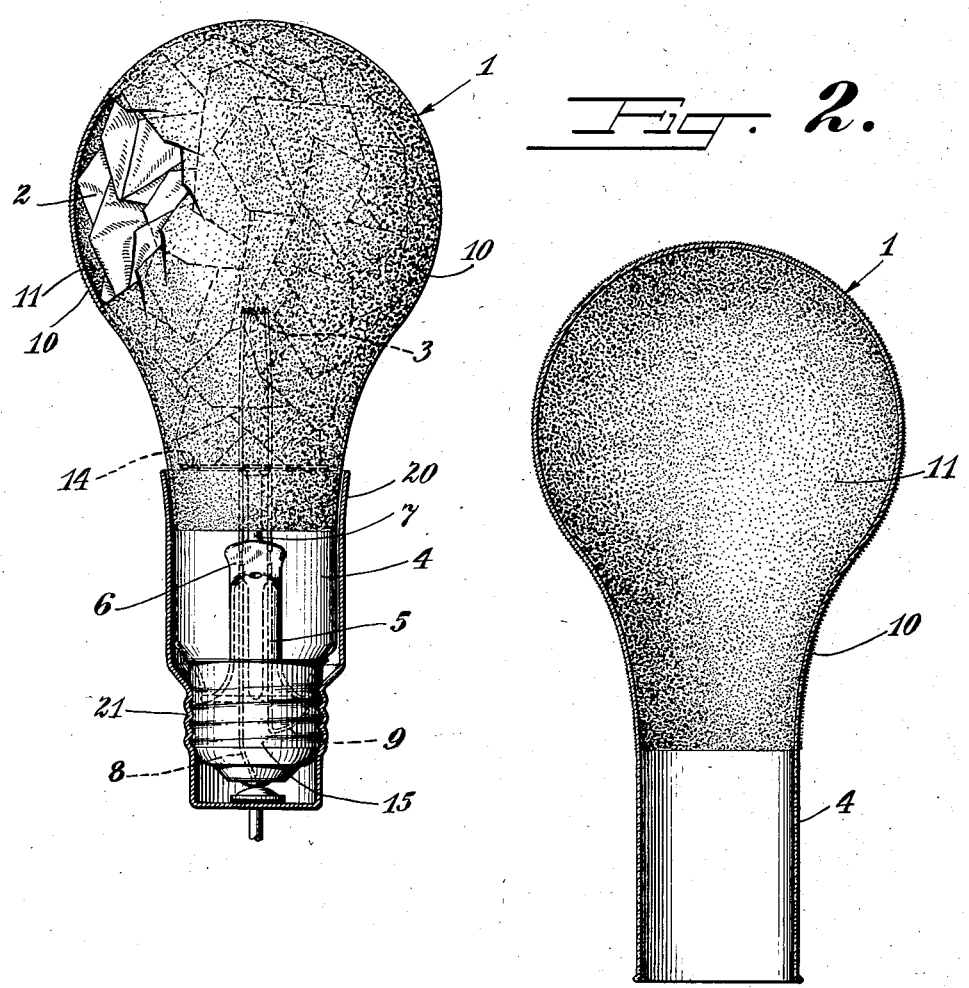
INVENTOR
J. H. KURLANDER
BY M. F. Rege
ATTORNEY Patented July 7, 1936

2,046,388

UNITED STATES PATENT OFFICE 2,046,388

PHOTOFLASH LAMP

John H. Kurlander, Nutley, N. J., assignor to Westinghouse Lamp Company, a corporation of Pennsylvania Application May 16, 1933, Serial No. 671,331

3 Claims. (Cl. 67—31)

This invention relates to lamps and more particularly to lamps that are known as photoflash lamps. In its more specific aspect the invention is directed to an improved photoflash lamp type.

Prior to my invention photoflash lamps of the general type disclosed by Ostermeier in his United States Patent 1,776,637 were manufactured and used. A lamp of this character generally comprises a clear glass envelope containing a light producing charge and an ignition means therein. Provision is also made to prevent cracking of the bulb by coating the envelope on its inner side with cellulose acetate. The Ostermeier patent also suggests employing a yellow bulb or yellow screen or fitting for the bulb. Since the eye is most sensitive to yellow light, it is obvious that the effect on the eye by the sudden flashing of a lamp emitting yellow light would be more startling than if a less eye sensitive light were emitted.

My invention is primarily concerned with the obviation of these reactions which in themselves have been the reason for the exclusion of photographers from courtrooms and other public places of regulated decorum and for some people having an antipathy to being photographed by photoflash lamp light. Another primary reason for my invention is that a person may be photographed by the light of my photoflash lamp without knowing that he has been photographed. For the above purposes and so that photoflash lamps may find a more extended use, I have provided a photoflash lamp differing from ordinary photoflash lamp in the bulb thereof.

Instead of employing a clear glass bulb, a yellow glass bulb or yellow fittings interiorly or exteriorly of the bulb, all of which are highly permeable to that portion—yellow—of the spectrum to which the human eye is most sensitive, I employ an envelope adapted to absorb a real portion of the visible light generated in a photoflash lamp. My envelope has been more particularly devised so that it will transmit little, if any, of that portion—yellow—of the spectrum that is generated on charge combustion and to which the human eye is most sensitive. Although my improved photoflash lamp does not allow all of the light generated therein to be transmitted therethrough, but allows less than half thereof to be transmitted therethrough, I have found that the light transmitted therethrough will allow the taking of good negatives.

Even with some of my improved photoflash lamps I prefer to employ a proper yellow filter before the camera lens, which filter is to serve the same purpose as would a proper yellow bulb or fittings in a clear glass bulb. The main purpose of my invention; greatly reducing the quantity of visible light and especially the yellow light, to which the human eye is most sensitive, from being transmitted through the envelope of a photoflash lamp upon flashing; may be accomplished by employing my new envelope.

An object of my invention is the provision of an improved photoflash lamp which, when flashed, will transmit light therethrough that is not characterized by a sharp and dazzling glare.

Another object of my invention is to provide an improved photoflash lamp which may be employed in the photographic field for the taking of good negatives and which, when flashed, will absorb a substantial proportion of the generated light so that a person being photographed will not be subjected to a blinding and dazzling glare.

Another object of my invention is to provide a colored photoflash lamp of such design that the user thereof may be able to readily tell whether or not it has been flashed.

Another object of my invention is to provide a colored photoflash lamp having a removable screen associated therewith at that portion which serves to indicate whether or not the lamp has been flashed.

Another object of my invention is to provide an improved socket and photoflash lamp construction.

Another object of my invention is to provide a photoflash lamp which will find acceptable employment in courtroom and similar places of regulated decorum because of its anti-dazzling glare effect during flashing.

Another object of my invention is to provide an improved socket.

Other objects and advantages of my invention, inherent therein, are within the scope of my invention and some of these may be apparent from the following description and drawing wherein, Figure 1 represents a longitudinally cross sectional view, with some of the parts in elevation, of a photoflash lamp and an improved socket embodying my invention.

Figure 2 represents a perspective view of a lamp bulb embodying my invention and adapted to be employed as the bulb of a photoflash lamp embodying my invention.

As shown, the photoflash lamp comprises essentially a dielectric vitreous enclosing envelope 1, a suitable readily oxidizable foil charge 2 therein and a filament 3 therein adapted to be incandesced for igniting the charge 2. The envelope 1 has a neck 4 of appreciable length depending from the bulbous portion thereof. Fusedly ring sealed to said neck 4 and extending upwardly therein is a reentrant stem 5 having its upper free end in the form of a pinch or press 6. Supported by said press 6 is a vitreous rod 7 that extends an appreciable distance upwardly therefrom. Leading-in conductors 8 and 9 are sealed in said press and extend interiorly and exteriorly of said envelope. The filament 3 is electrically connected to the free ends of said conductors within the envelope and is adapted to be incandesced when a suitable potential is applied across the terminals thereof.

In accordance with my invention the envelope per se and especially the bulb thereof, as shown in Figure 2, may be composed of a vitreous material that is deep blue in color. The thickness and color of the glass is generally so chosen that a relatively inexpensive glass may be employed which will absorb a large proportion of the generated light and especially the yellow light produced during flashing of the charge and which will allow the transmission therethrough of sufficient light in that region of the spectrum known as blue, violet and ultra violet, so that a photographic film may be properly affected. Instead of employing a glass having these characteristics, I have found that I may carry out my invention by a coating or film of material of appropriate thickness, color and color density. This coating may be applied on the inside, or outside or to both surfaces, of the bulb.

The coating of the bulb may be formed by spraying, dipping or otherwise coating either or both the inside and outside of the bulb with a solution in the following proportions:

378 grams of cellulose acetate 5-second viscosity
3024 cubic centimeters of acetone
756 grams of ethyl lactate
90 grams of methylene blue or brilliant blue solution of an alcohol soluble dye with this solution containing
4-7 grams of methylene blue or brilliant blue dye in about
90 cubic centimeters of methyl or ethyl alcohol The bulb may have an exterior coating 10 and an interior coating 11 thereon. Both of these coatings, because of their thickness, color and color density, serve to absorb a great proportion of the generated light and especially the yellow light produced on flashing of the charge 2 which is located in the envelope 1 containing a suitable gas therein at an appropriate pressure.

Besides serving this purpose the interior and exterior coatings or films 10 and 11 that are contiguous with the glass and firmly adherent thereto, respectively serve to prevent bulb cracking on charge flashing and to render the bulb substantially shatterproof. Since it is necessary to provide an interior coating on all photoflash lamps and all those on the market now contain an interior coating for this purpose, I may at a very slight, almost insignificant, cost color the interior coating so that my purpose may be accomplished. This coating may be about 0.25 of a mil. in thickness, but it is within the purview of my invention to provide a thicker interior colored coating.

Further, I may provide an interior coating of appropriate thickness and consisting of a plurality of layers of colored material, with each layer differing in color from the next succeeding layer so that certain wave lengths of the spectrum may be selectively absorbed. Instead of having an interior coating made up of a plurality of layers of different colors, I may provide an interior layer of one color such as blue and an exterior layer of another color such as green, or I may provide a plurality of layers of different colors for my interior coating and also have an exterior coating also comprised of layers of different colors that are the same as or different than the colors of the layers of the interior coating.

Although a clear glass bulb having either or both of the interior or exterior colored coatings as herein described, it is within the purview of my invention to provide a bulb of colored glass such as blue having either or both an exterior and an interior blue or other appropriately colored coating of material, such as that hereinbefore described. I may also employ a small quantity of a nigrosine alcohol soluble organic dye together with the blue dye, if I desire.

The coating material comprising the cellulose lacquer consisting of cellulose acetate, acetone and ethyl lactate and containing an appropriate quantity of one or more alcohol soluble dyes is sprayed on to either or both the exterior or interior surface of the bulb in order that the same may have the entire interior or exterior surface of both coated with an appropriately colored film. Thereafter, if desired, more coatings may be applied thereto. The coating material at the lower portion of the neck of the bulb is removed therefrom so that the interior and exterior coatings end at that point of the neck opposite the press.

The bulb, having the major portion thereof coated and the lower portion of its neck clear and uncoated, is filled with an appropriate photoflash lamp foil charge. The stem carrying the leads, incandescent wire and an asbestos disc 14 resting on the rod 7 is inserted into the envelope. A sealing-in flame is directed against that portion of the neck where said neck intersects the flare of the stem for fusedly ring-sealing the stem 5 to the neck 4. An ordinary screw base 15 is secured to the lower end of the neck and has the leading-in conductors 8 and 9 in proper relation thereto.

As shown, the upper edge of the base 15 is located appreciably below the limit of both the exterior and the interior coating so that about one-fourth or more of the length of said neck shall be of clear glass. This clear glass area serves as a window so that the person using lamps of this character may be readily apprised of whether or not the lamp has been flashed. If it has not been flashed this area of the glass between the upper limit of the base and the lower limit of the colored coatings will be clear. But, if the lamp has been flashed, it will be milky white.

In order that the purposes of my invention may be efficiently carried out, I propose to cover said clear section with a readily removable opaque element 20 which surrounds the clear area of the bulb so that upon lamp flashing no appreciable quantity of light will be emitted through said area and strike the eyes of the person being photographed. The element 20 may be integral with and of the same composition as the ordinary lamp socket 21, as shown. The element 20 is of cylindrical shape and adapted to accommodate the neck of the bulb and extends an appreciable distance above the lower limit of the coatings. Instead of having the element 20 secured to the socket, it may be in the form of a loosely fitted cardboard cylinder carried on the lower portion of the lamp and adapted to be slipped off of said neck when desired.

Although the invention has been described with some particularity, it is subject to modifications and it is to be limited only by the prior art.

What is claimed is:

1. A photoflash lamp comprising an envelope, a flash light producing charge located therein, said envelope being composed of clear glass and having a bulbous and a neck portion, a colored coating located on the surface of said bulbous portion, said coated portion having a low transparency factor to the yellow light produced therein for reducing the dazzling effect when the charge within said envelope is flashed and being sufficiently permeable to the wave lengths of the spectrum produced therein that photographs may be taken by the light transmitted therethrough when the charge is flashed, the neck portion of said envelope being substantially clear and serving as a window for an operator to distinguish between flashed and unflashed lamps and a substantially opaque removable means surrounding said neck portion during lamp flashing.

2. Electrical apparatus comprising a photoflash lamp and a socket therefor, said lamp having a base located in said socket, said lamp having an envelope, the major portion of said envelope being colored, said portion having a low transparency factor to the yellow light produced therein for reducing the dazzling effect when a charge within said lamp is flashed, said portion being sufficiently permeable to the shorter wave lengths of the spectrum produced therein that photographs may be taken by the light transmitted through said envelope when the charge is flashed, another portion of said envelope characterized by a lesser color density than the major portion thereof to serve as a window for the operator to distinguish between flashed and unflashed lamps, and substantially opaque removable means surrounding said other portion during lamp flashing.

3. An electrical apparatus comprising a photoflash lamp including an envelope, a base, a flash light charge in said envelope and a socket for said lamp, said lamp having its base located in said socket, a coating of colored material located on a major portion of the surface of said envelope, said coating having a low transparency factor to the yellow light produced therein for reducing the dazzling effect when said charge is flashed, said coated portion of said envelope being sufficiently permeable to the shorter wave lengths of the spectrum produced therein that photographs may be taken by the light transmitted through said envelope when the charge is flashed, the lower limit of said coating being located above the upper edge of said base, that portion of the envelope between the lower edge of said coating and the upper edge of said base serving as a window for an operator to distinguish between flashed and unflashed lamps and a substantially opaque removable means surrounding said window during lamp flashing.

JOHN H. KURLANDER.